United States Patent

Nishihara et al.

[11] Patent Number: 5,866,812
[45] Date of Patent: Feb. 2, 1999

[54] WHEEL PRESSURE-REDUCTION DETERMINING SYSTEM FOR VEHICLE

[75] Inventors: Takashi Nishihara; Shuji Shiraishi; Osamu Yamamoto, all of Wako; Osamu Yano, Tochigi, all of Japan

[73] Assignee: Honda Giken Kogyo Kabushiki Kaisha, Tokyo, Japan

[21] Appl. No.: 729,242

[22] Filed: Oct. 9, 1996

[30] Foreign Application Priority Data

Oct. 11, 1995 [JP] Japan .................................. 7-262685

[51] Int. Cl.⁶ ............................ B60C 23/00; F02D 29/02
[52] U.S. Cl. ......................... 73/146.2; 340/443; 701/29
[58] Field of Search .................... 73/146.2, 146.5; 340/442, 443, 444; 701/29, 71

[56] References Cited

U.S. PATENT DOCUMENTS

| | | | |
|---|---|---|---|
| 4,567,460 | 1/1986 | Gebler | 73/146.5 X |
| 4,574,267 | 3/1986 | Jones | 340/443 |
| 4,876,528 | 10/1989 | Walker et al. | 340/442 |
| 5,192,929 | 3/1993 | Walker et al. | 340/444 |
| 5,218,862 | 6/1993 | Hurrell, II et al. | 73/146.5 |
| 5,239,469 | 8/1993 | Walker et al. | 73/146.5 X |
| 5,327,346 | 7/1994 | Goodell | 73/146.2 X |
| 5,343,741 | 9/1994 | Nishihara et al. | 73/146.2 |
| 5,345,217 | 9/1994 | Prottey | 340/442 |
| 5,442,331 | 8/1995 | Kishimoto et al. | 340/444 |
| 5,483,220 | 1/1996 | Kushimoto et al. | 340/444 |
| 5,541,573 | 7/1996 | Jones | 340/444 |
| 5,552,760 | 9/1996 | Jones | 340/444 |
| 5,561,415 | 10/1996 | Dieckmann | 340/444 |
| 5,578,984 | 11/1996 | Nakajima | 73/146.5 X |
| 5,589,816 | 12/1996 | Jones | 73/146.5 X |
| 5,629,478 | 5/1997 | Nakajima et al. | 73/146.2 |
| 5,670,716 | 9/1997 | Tamasho et al. | 73/146.2 |

FOREIGN PATENT DOCUMENTS

| | | |
|---|---|---|
| 0 497 120 A1 | 8/1992 | European Pat. Off. . |
| 0 554 131 A1 | 2/1993 | European Pat. Off. . |
| 44 00 913 A1 | 7/1995 | Germany . |

OTHER PUBLICATIONS

European Search Report for European Patent Application No. EP 96 11 6335 dated Jan. 22, 1997.

Primary Examiner—Ronald L. Biegel
Assistant Examiner—Paul D. Amrozowicz
Attorney, Agent, or Firm—Armstrong, Westerman, Hattori, McLeland & Naughton

[57] ABSTRACT

A reduction in tire pressure in follower wheels and driven wheels is precisely determined irrespective of slipping states of the driven wheels through the use of apparatus wherein in a driven wheel slip amount calculating means M4 calculates a driven wheel slip amount KIDD as a left and right follower wheel speed difference FID and a left and right driven wheel speed difference RID; in a driven wheel torque calculating means M5, a driven wheel torque TQDW is calculated; in a driven wheel slip amount estimating means M6, a characteristic of variation in driven wheel slip amount KIDD relative to the variation in driven wheel torque TQDW is estimated using a least squares method; in a deviation calculating means M7, a deviation CKID between the follower wheel speed difference FID and the driven wheel speed difference RID in a state in which the driven wheels are not slipping, is calculated as an intercept of the driven wheel slip amount KIDD at a driven wheel torque equal to 0 (zero) in a graph of the variation characteristic; and in a wheel pressure-reduction determining means M8, a reduction in tire pressure is determined from a difference in diameter between the follower wheels and the driven wheels by comparing the deviation CKID with a reference value.

3 Claims, 6 Drawing Sheets

WHEEL PRESSURE-REDUCTION DETERMINING SYSTEM FOR VEHICLE

BACKGROUND OF THE INVENTION

1. Field of the Invention

The present invention relates to a wheel pressure-reduction determining system for a vehicle for determining a reduction in pressure in a tire based on a difference in diameter between follower and driven wheels.

2. Description of the Related Art

A traction control system or an antilock brake system in a vehicle includes rotation-number sensors in the follower and driven wheels to detect follower wheel speeds and driven wheel speeds used for calculation of a slip rate of a wheel, or the like. However, if the tire is reduced in diameter due to a reduction in tire pressure, the numbers of rotations of the follower wheels and of the driven wheels detected by the rotation-number sensors do not correctly correspond to the follower wheel speeds and the driven wheel speeds.

Therefore, in a conventional system, a difference between the left and right follower wheel speeds is compared with a difference between the left and right driven wheel speeds. If the difference between the left and right follower wheel speeds is larger than the left and right driven wheel speeds, it is determined that a reduction in diameter due to a reduction in tire pressure has been produced in any of the follower wheels. If the difference between the left and right driven wheel speeds is larger than the difference between the left and right follower wheel speeds, it is determined that a reduction in diameter due to a reduction in tire pressure has been produced in any of the driven wheels.

However, the above prior art technique has the following problem: When a difference is produced between slipping states in the wheels, for example, because of unbalanced depths of the tires of the left and right driven wheels, it is impossible to discriminate a difference between the left and right driven wheel speeds due to the difference between the slipping states from a difference between the left and right driven wheel speeds due to the reduction in diameter caused by the reduction in tire pressure. Therefore, it is impossible to precisely detect the reduction in diameter caused by the reduction in tire pressure in the tire.

The present invention has been accomplished with the above circumstances in view, and it is an object of the present invention to provide a wheel pressure-reduction determining system for a vehicle, wherein a reduction in pressure in the follower wheels and the driven wheels can be precisely determined irrespective of slipping states of the driven wheels.

SUMMARY OF THE INVENTION

To achieve the above object, according to the present invention, there is provided a wheel pressure-reduction determining system for a vehicle, comprising: a follower wheel speed difference calculating means (M1) for calculating a follower wheel speed difference (FID) as a difference between left and right follower wheel speeds (VWNL and VWNR); a driven wheel speed difference calculating means (M2) for calculating a driven wheel speed difference (RID) as a difference between left and right driven wheel speeds (VWDL and VWDR); a driven wheel slip amount calculating means (M4) for calculating a driven wheel slip amount (KIDD) of the follower and driven wheel speeds as a deviation between both the speed differences (FID and RID); a driven wheel torque calculating means (M5) for calculating a driven wheel torque (TQDW) based on an engine torque; a driven wheel slip amount estimating means (M6) for estimating a characteristic of variation in the driven wheel slip amount (KIDD) relative to the driven wheel torque (TQDW), based on the driven wheel slip amount (KIDD) and the driven wheel torque (TQDW); a deviation calculating means (M7) for calculating a deviation (CKID) between both the speed differences (FID and RID) of the follower and driven wheel speeds as the driven wheel slip amount (KIDD) at the time when the driven wheel torque (TQDW) is zero, from the variation characteristic estimated by the driven wheel slip amount estimating means (M6); and a wheel pressure-reduction determining means (M8) for determining a reduction in tire pressure of follower wheels ($W_{FL}$ and $W_{FR}$) and driven wheels ($W_{RL}$ and $W_{RR}$) by comparing the deviation (CKID) calculated by the deviation calculating means (M7) with a predetermined reference value.

According to the present invention, it is also contemplated that the driven wheel slip amount estimating means (M6) obtains data for estimating the variation characteristic of the driven wheel slip amount (KIDD) relative to the driven wheel torque (TQDW) in each of plurality of torque areas classified depending upon the magnitude of the driven wheel torque (TQDW), and obtains data in the torque areas, including a state of driven wheel torque of zero, in an amount larger than the amount of data in other torque areas.

According to the present invention, it is further contemplated that the driven wheel slip amount estimating means (M6) includes a driven wheel torque area limiting means (M3) for limiting a torque area for obtaining data for estimating the variation characteristic in accordance with a friction coefficient of a road surface.

BRIEF DESCRIPTION OF THE DRAWINGS

The mode of the present invention will be described by way of an embodiment with reference to the accompanying drawings, in which

FIG. 1 is a diagrammatic illustration of a vehicle including a wheel pressure-reduction determining system;

FIG. 2 is a block diagram of a control system;

FIG. 3 is a block diagram of the wheel pressure-reduction determining system;

FIG. 4 is a first portion of a flow chart for determining the wheel pressure-reduction;

FIG. 5 is a second portion of the flow chart of FIG. 4 for determining the wheel pressure-reduction; and FIG. 6 is a graph illustrating the characteristic of variation in slip amount of driven wheels.

DETAILED DESCRIPTION OF THE PREFERRED EMBODIMENT

Figure 1:
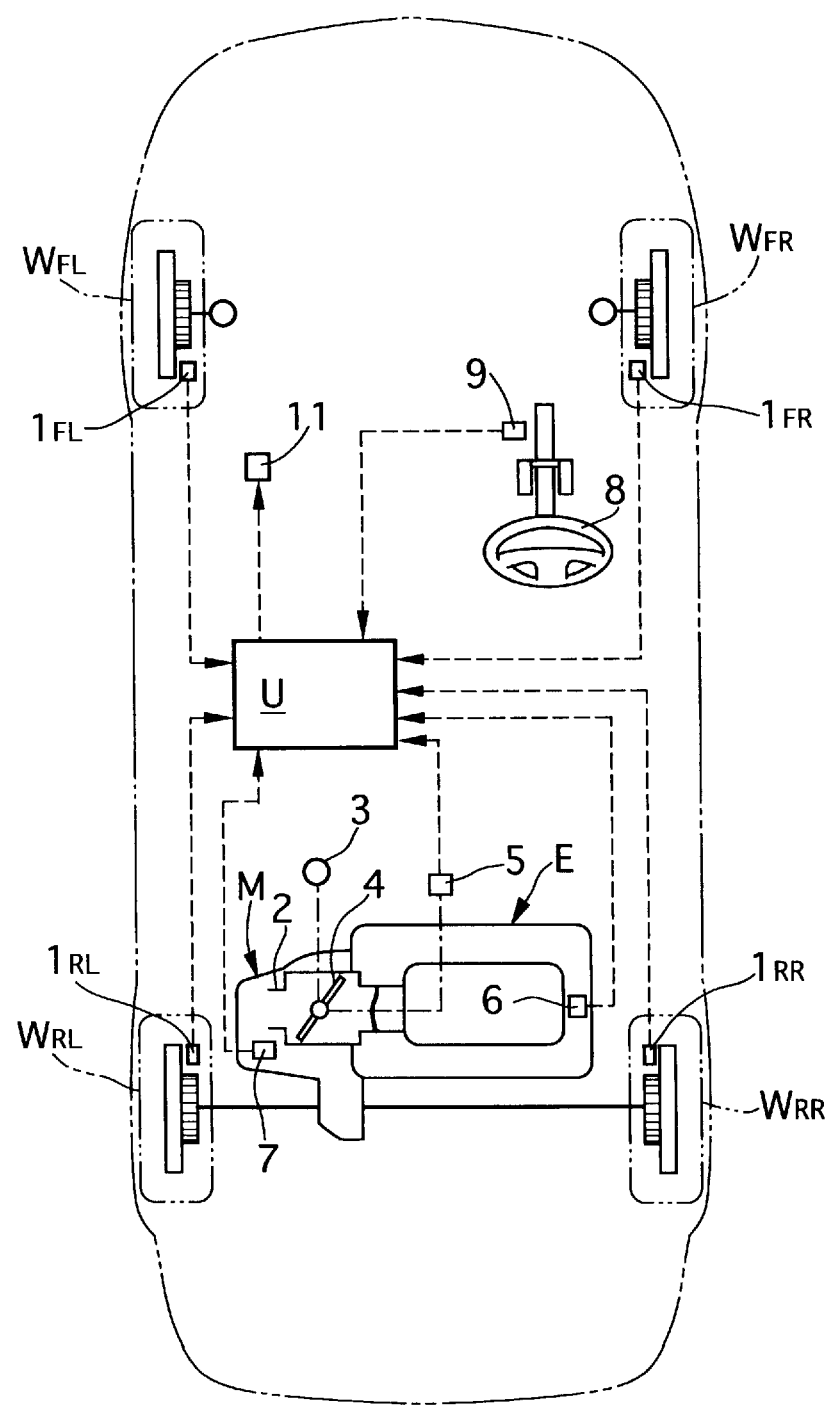
FIGS. 1 to 6 illustrate an embodiment of the present invention.

As shown in FIG. 1, the vehicle is a rear wheel drive vehicle and includes a pair of left and right driven wheels $W_{RL}$ and $W_{RR}$ driven by an engine E, and a pair of follower wheels $W_{FL}$ and $W_{FR}$ which are steerable. Driven wheel speed detecting means $1_{RL}$ and $1_{RR}$ are mounted on the driven wheels $W_{RL}$ and $W_{RR}$, and follower wheel speed detecting means $1_{FL}$ and $1_{FR}$ are mounted on the follower wheels $W_{FL}$ and $W_{FR}$.

A throttle valve 4 is mounted in an intake passage 2 in the engine E and connected to, and opened and closed by, a pulse motor 3. The opening degree θTH of the throttle valve 4 is detected by a throttle opening degree detecting means 5.

An engine revolution-number detecting means 6 is mounted in the engine E for detecting a number Ne of revolutions of the engine E, and a shift position detecting means 7 is mounted in a transmission M for detecting a shift position SP. Further, a steering angle detecting means 9 is mounted on a steering wheel 8 for detecting steering angle δ.

The driven wheel speed detecting means $1_{RL}$ and $1_{RR}$, the follower wheel speed detecting means $1_{FL}$ and $1_{FR}$, the throttle opening degree detecting means 5, the engine revolution-number detecting means 6, the shift position detecting means 7 and the steering angle detecting means 9 are connected to an electronic control unit U including a microcomputer. Further, a warning means 11, such as a lamp, a buzzer, chime, or the like, is connected to the electronic control unit U to give a warning when a difference in diameter is generated between wheels due to a reduction in tire pressure.

Figure 2:
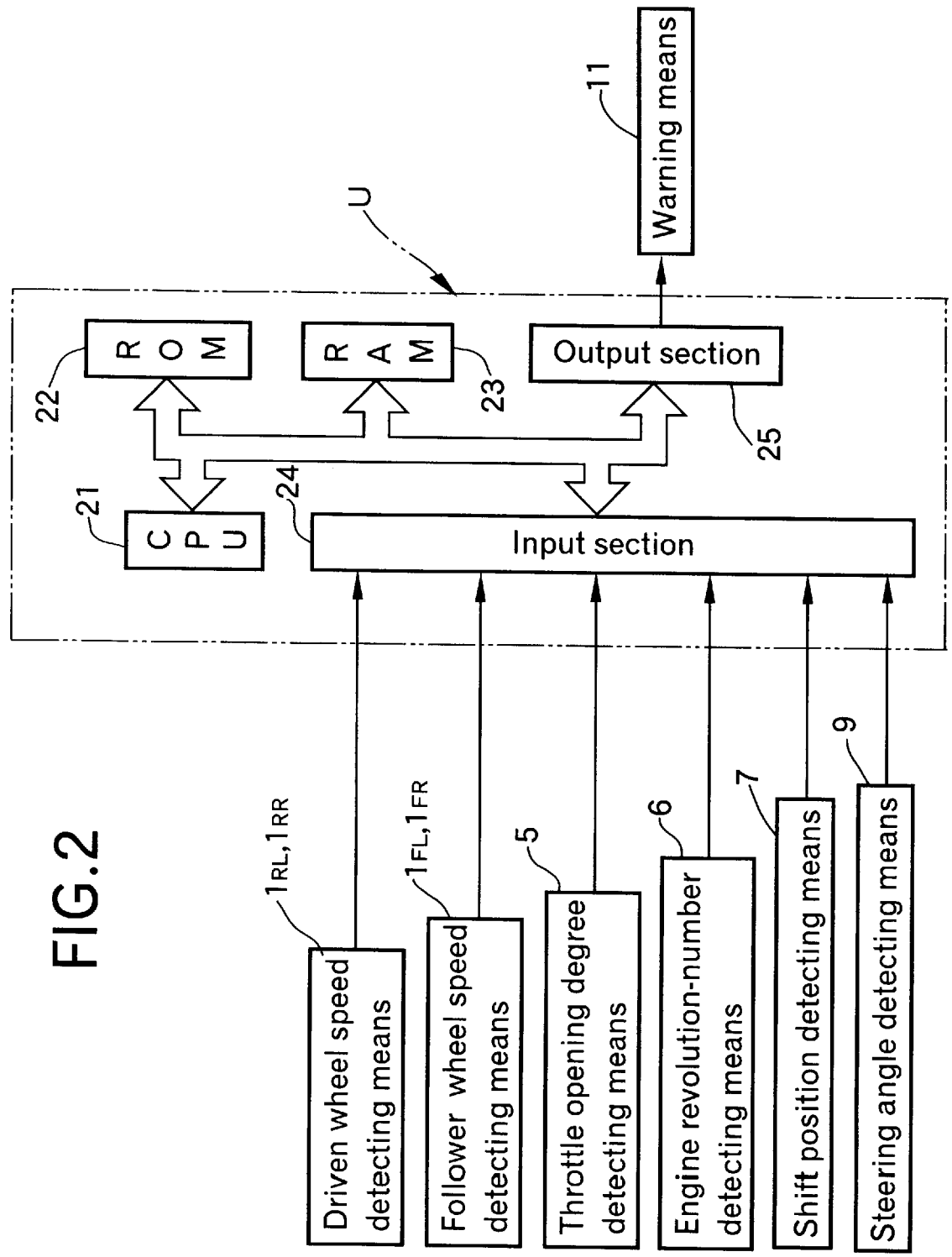

FIG. 2 shows the electronic control unit U which calculates signals from the various detecting means according to a control program to operate the warning means 11 in order to give a warning when the reduction in tire pressure in the wheel is generated. The electronic control unit U includes a central processing unit (CPU) 21 for carrying out the calculations; a read-only memory (ROM) 22 having the control program and data, such as various maps, and the like, stored therein; a random access memory (RAM) 23 for temporarily storing the output signals from the various detecting means and the calculation results; an input section 24 to which the various detecting means, i.e., the driven wheel speed detecting means $1_{RL}$ and $1_{RR}$, the follower wheel speed detecting means $1_{FL}$ and $1_{FR}$, the throttle opening degree detecting means 5, the engine revolution-number detecting means 6, the shift position detecting means 7 and the steering angle detecting means are connected; and an output section 25 to which the warning means 11 is connected. Thus, the electronic control unit U calculates the various signals inputted through the input section and the data stored in the read-only memory 22 in the central processing unit 21 according to the control program which will be described hereinafter, and finally operates the warning means 11 through the output section 25.

Figure 3:
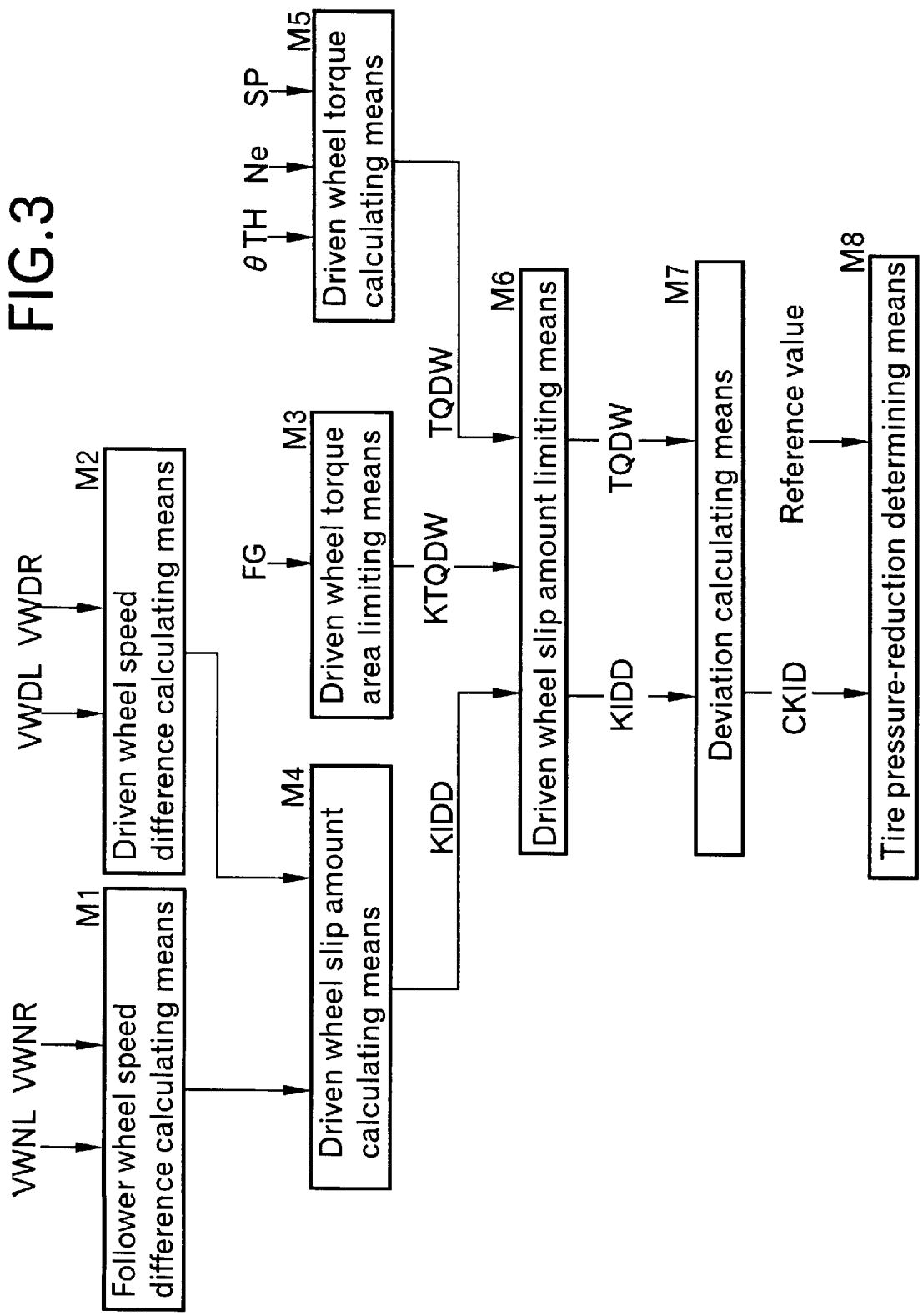

As shown in FIG. 3, the wheel pressure-reduction determining system includes a follower wheel speed difference calculating means M1, a driven wheel speed difference calculating means M2, a driven wheel torque area limiting means M3, a driven wheel slip amount calculating means M4, a driven wheel torque calculating means M5, a driven wheel slip amount estimating means M6, a deviation calculating means M7 and a wheel pressure-reduction determining means M8.

The follower wheel speed difference calculating means M1 calculates a follower wheel speed difference FID based on follower wheel speeds VWNL and VWNR detected by the follower wheel speed detecting means $1_{FL}$ and $1_{FR}$. The driven wheel speed difference calculating means M2 calculates a driven wheel speed difference RID based on driven wheel speeds VWDL and VWDR detected by the driven wheel speed detecting means $1_{RL}$ and $1_{RR}$. Steering angle conversion values obtained by converting an actual follower wheel speed difference and an actual driven wheel speed difference into the magnitude of a steering angle using a vehicle speed are used as the follower wheel speed difference FID and the driven wheel speed difference RID. The driven wheel torque area limiting means M3 calculates a driven wheel limit torque KTQDW depending upon a friction coefficient μ of a road surface based on a longitudinal acceleration FG of the vehicle.

The driven wheel slip amount calculating means M4 calculates a driven wheel slip amount KIDD based on a difference between the follower wheel speed difference FID and the driven wheel speed difference RID. The driven wheel torque calculating means M5 calculates a driven wheel torque TQDW based on the throttle opening degree θTH detected by the throttle opening degree detecting means 5, the engine revolution-number Ne detected by the engine revolution-number detecting means 6 and the shift position SP detected by the shift position detecting means 7.

The driven wheel slip amount estimating means M6 presumes a characteristic of variation in driven wheel slip amount relative to the driven wheel torque TQDW based on the driven wheel slip amount KIDD and the driven wheel torque TQDW. The deviation calculating means M7 calculates a deviation CKID between the speed differences FID and RID as a driven wheel slip amount KIDD at the time when the driven wheel torque TQDW is zero, based on the variation characteristic. The wheel pressure-reduction determining means M8 determines a tire pressure reduction from a difference in diameter between the follower wheels $W_{FL}$ and $W_{FR}$ and the driven wheels $W_{RL}$ and $W_{RR}$ by comparing the deviation CKID with a predetermined reference value.

Figure 4:
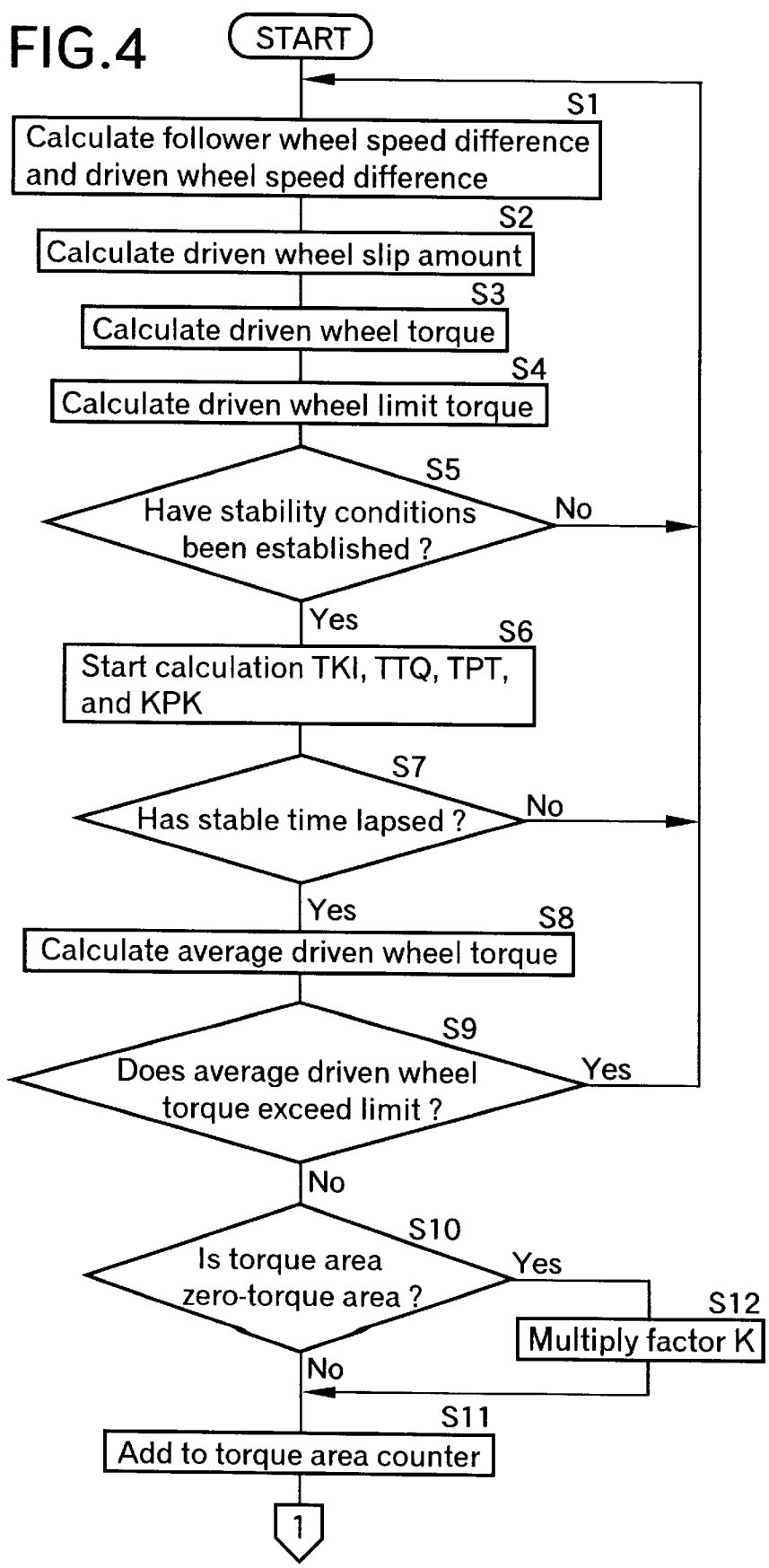
Figure 5:
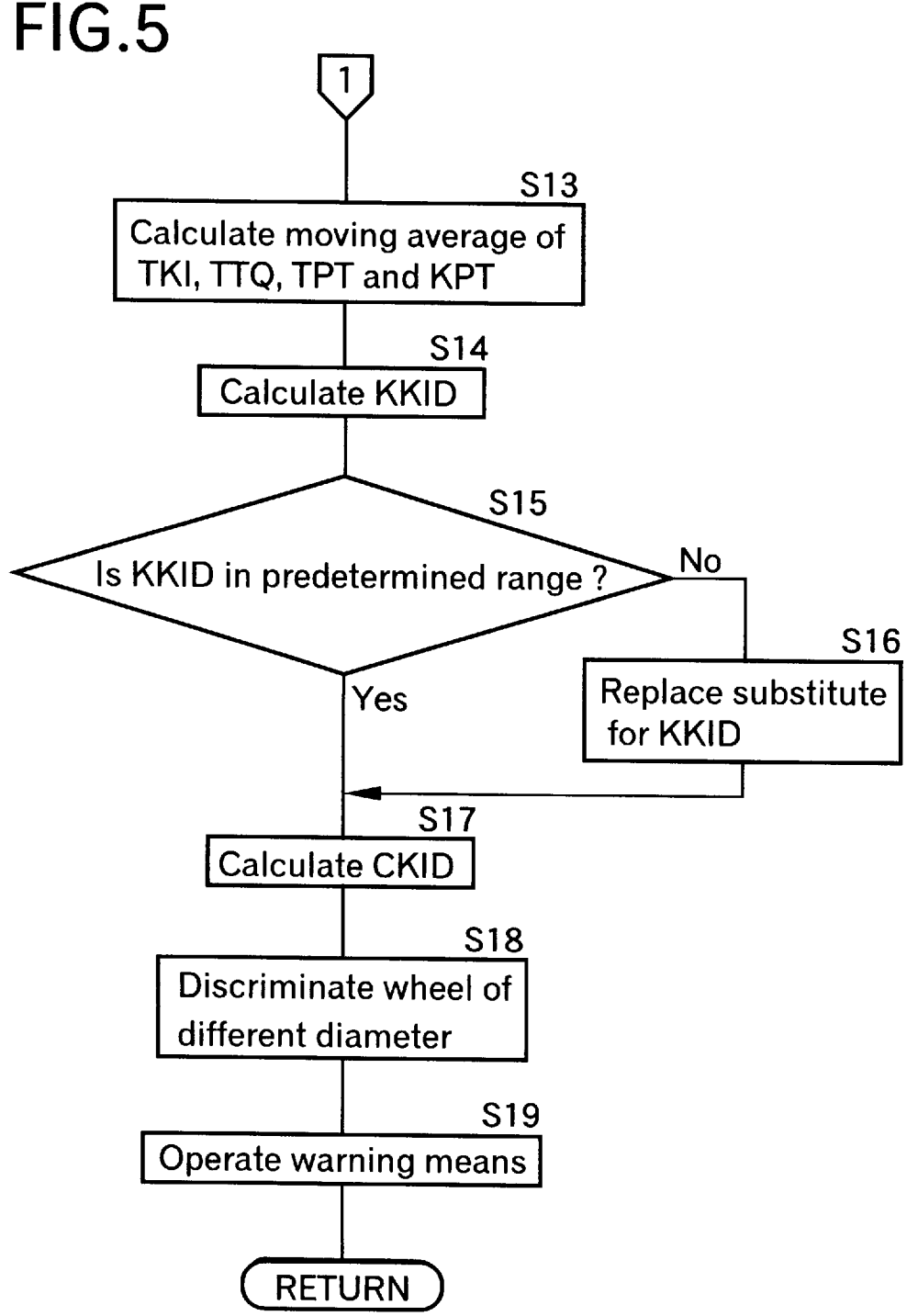

The operation of the embodiment of the present invention having the above-described arrangement will be described below with reference to the flow chart shown in FIGS. 4 and 5.

First, in the follower wheel speed difference calculating means M1, the right follower wheel speed VWNR is subtracted from the left follower wheel speed VWNL to calculate a follower wheel speed difference FID (VWNL−VWNR steering angle-conversion value), and in the driven wheel speed difference calculating means M2, a right driven wheel speed VWDR is subtracted from a left driven wheel speed VWDL to calculate a driven wheel speed difference RID (VWDL−VWDR steering angle-conversion value) (at step S1). Then, in the driven wheel slip amount calculating means M4, a driven wheel slip amount KIDD (KIDD=FID−RID) by subtracting the driven wheel speed difference RID from the follower wheel speed difference FID (at step S2).

Then, in the driven wheel torque calculating means M5, an engine torque is calculated from the opening degree θTH of the throttle valve 4 detected by the throttle opening degree detecting means 5 and the engine revolution-number Ne detected by the engine revolution-number detecting means 6, and a driven wheel torque TQDW is calculated by multiplying a primary filtered value of the engine torque by a gear ratio in the shift position SP detected by the shift position detecting means 7 (at step S3). The driven wheel torque TQDW may assume a negative value, for example, during operation of an engine brake.

Subsequently, in the driven wheel torque area limiting means M3, a driven wheel limit torque KTQDW (KTQDW=FG×Wt×DLR) is calculated based on a longitudinal acceleration FG of the vehicle based on the driven wheel torque TQDW, or a longitudinal acceleration FG of the vehicle detected by a longitudinal acceleration sensor (not shown), a driven wheel axle load Wt and a driven wheel dynamic radius DLR (at step S4). The driven wheel limit torque KTQDW is a value varied depending upon the friction coefficient μ of the road surface. The value is smaller on a road surface of a lower friction coefficient μ and larger on a road surface of a higher friction coefficient μ.

Then, in the driven wheel slip amount estimating means M6, it is determined whether stability conditions for carrying out the determination of the reduction in pressure of the wheel have been established (at step S5). More specifically, it is determined whether any of the four wheel speeds VWDL, VWDR, VWNL and VWNR are within predetermined ranges; whether the amounts of variation in driven wheel speeds VWDL and VWDR and in follower speed speeds VWNL and VWNR within a predetermined time are within predetermined ranges; whether the longitudinal acceleration and the lateral acceleration are within predetermined ranges; whether the driven wheel torque TQDW is within a predetermined range; and also whether the variation rate of the steering angle δ is within a predetermined range; whether the vehicle is not being braked; whether the vehicle is not being subjected to a traction control; whether the transmission is not being shift-changed; whether the traveling of the vehicle is not on a bad road; whether the difference between the follower wheel speed difference and the driven wheel speed difference RID is within a predetermined range; and whether the amount of variation in yaw rate and vehicle speed within a predetermined time are in a predetermined range. If all these conditions have been established, it is determined that the vehicle is in a stable travel state, and the determination of the reduction in tire pressure of the wheel is carried out.

Then, the driven wheel torque TQDW and the driven wheel slip amount KIDD calculated in every loop are added in sequence until a lapse of a stable time (a time for which an n-loop is carried out) according to the following equations (1) to (4) to calculate four additional values TKI, TTQ, KPK and TPT (at steps S6 and S7):

$$TKI(n)=TQDW(1) \times KIDD(1)+TQDW(2) \times KIDD(2)+ \ldots +TQDW(n) \times KIDD(n) \quad (1)$$

$$TTQ(n)=TQDW(1)^2+TQDW(2)^2+ \ldots +TQDW(n)^2 \quad (2)$$

$$KPK(n)=KIDD(1)+KIDD(2)+ \ldots +KIDD(n) \quad (3)$$

$$TPT(n)=TQDW(1)+TQDW(2)+ \ldots +TQDW(n) \quad (4)$$

Then, the addition value TPT of the driven wheel torques calculated according to the equation (4) is divided by n to calculate an average value of the driven wheel torques (at step S8).

Subsequently, the average value of the driven wheel torques TQDW calculated at step S8 is compared with the driven wheel limit torque TQDW calculated at step S3. If the average value of the driven wheel torques TQDW does not exceed the driven wheel limit torque TQDW, i.e., when the torque area is an area in which a linearity is maintained in the relationship between the driven wheel torque and the driven wheel slip amount, the processings at step S10 and subsequent steps are carried out (at step S9). Thus, it is possible to correctly presume the characteristic of variation in driven wheel slip amount KIDD relative to the variation in driven wheel torque TQDW, which will be described hereinafter.

The average value of the driven wheel torques TQDW is classified into, for example, eight torque areas (1), (2), (3), (4), (5), (6), (7) and (8). The area (1) is a minimum torque area (a negative value); the area (8) is a maximum torque area (a positive value); and the area (3) is a zero-torque area (a torque area in which the driven wheel torque is near zero). Corresponding counters are provided in the eight torque areas (1) to (8), respectively.

Then, if the average value of the driven wheel torques calculated at step S8 has not fallen into the zero-torque area (3), 1, which is a maximum value, is added to the counter in the torque area (1), (2), (4), (5), (6), (7) or (8) into which such average value has fallen (at steps S10 and S11). On the other hand, if the average value of the driven wheel torques calculated at step S8 has fallen into the zero-torque area (3), a factor K (K<1) is added to the counter in the zero-torque area (3). For example, if K=0.1, 0.1 is added to the counter in the zero-torque area (3) (at steps 12 and S11).

Subsequently, a moving average of the four addition values TKI, TTQ, KPK and TPT is calculated according to the following equation (5) (at step S13).

$$T?(m)=(1/m) \times T?+(m-1/m) \times T?(m-1) \quad (5)$$

wherein T?=TKI, TTQ, KPK or TPT.

Thus, the moving average of the four addition values TKI, TTQ, KPK and TPT is calculated for each of the eight torque areas (1) to (8). However, if the value of the counter in each of the torque areas (1) to (8) assumes 1, which is the maximum value, the calculation of the four addition values TKI, TTQ, KPK and TPT and the average value of them in each of the torque areas (1) to (8) is discontinued. In other words, in each of the torque areas (1), (2), (4), (5), (6), (7) and (8) other than the zero-torque area (3), a run of gaining of data for a stable time is carried out, and in the zero-torque area (3), a plurality of runs of gaining of data for the stable time depending upon the factor K (for example, if K=0.1, 10 runs) are carried out.

Then, in the deviation calculating means M7, a gradient KKID is calculated from an equation (6) based on the moving average of the four addition values TKI, TTQ, KPK and TPT (at step S14).

$$KKID=\{n \times TKI-KPK \times TPT\}/\{n \times TTQ-TPT^2\} \quad (6)$$

Thus, if a characteristic curve providing a relation, appearing to be most definite, of the variation in driven wheel slip amount KIDD to the variation in driven wheel torque TQDW is estimated using a least squares method (see FIG. 6), the gradient KKID obtained from the equation (6) corresponds to a gradient when the driven wheel torque TQDW in the characteristic curve is equal to 0 (zero).

Figure 6:
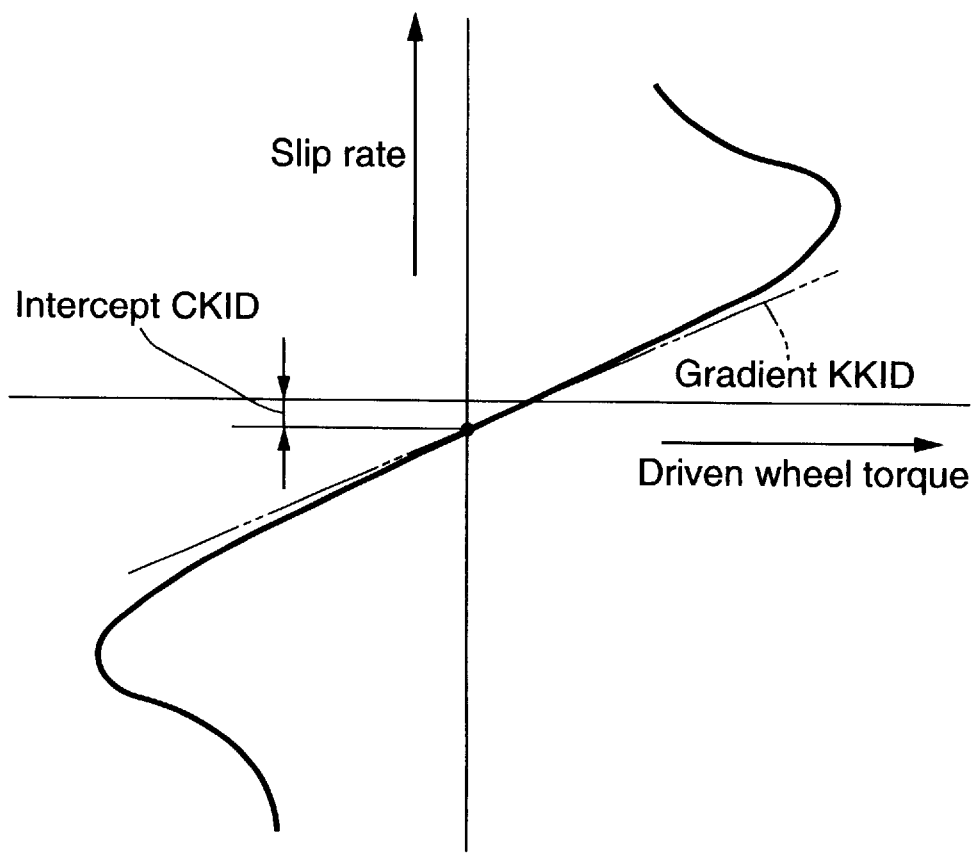

When the gradient KKID is in a predetermined range, by using such gradient KKID, and when the gradient KKID is out of the predetermined range, by using a substitute value as KKID, an intercept CKI corresponding to an intercept on the ordinate axis in the characteristic curve in FIG. 6 is calculated according to the following equation (7) (at steps S15 to S17).

$$CKID=(KPK-KKID \times TPT)/n \quad (7)$$

The intercept CKID represents a deviation between the follower wheel speed difference FID and the driven wheel speed difference RID when the driven wheels $W_{RL}$ and $W_{RR}$ are not in slipped states (i.e., represents a driven wheel slip amount KIDD).

When the intercept CKID is zero and the characteristic curve in FIG. 6 passes through the origin, the follower wheel speed difference FID and the driven wheel speed difference RID are equal to each other and, hence, it is determined that both of the left and right follower wheels $W_{FL}$ and $W_{FR}$ are not reduced in diameter and both of the driven wheels $W_{RL}$ and $W_{RR}$ are not reduced in diameter.

When the intercept CKID is not zero, a difference between the intercept CKID and a reference value stored by learning, or a difference between the intercept CKID and a previously set reference value is calculated. If such difference is larger than a predetermined threshold value, it is determined that a reduction in diameter due to a reduction in tire pressure is produced in the follower wheels $W_{FL}$ and $W_{FR}$ or in the driven wheels $W_{RL}$ and $W_{RR}$ (at step S18), and the warning means 11 is operated to give a warning to a driver (at step S1).

This will be further described below. If the intercept CKID (a driven wheel slip amount KIDD [KIDD=FID–RID] in a state that the driven wheel torque=0) assumes a positive value, the follower wheel speed difference FID is larger than the driven wheel speed difference RID and, hence, it can be determined that a reduction in diameter has been produced in any of the left and right follower wheels $W_{FL}$ and $W_{FR}$. At this time, if the follower wheel speed difference FID [the steering angle conversion value of VWNL–VWNR] is a positive value, it can be determined that the left follower wheel $W_{FL}$ has been reduced in diameter. If the follower wheel speed difference FID is a negative value, it can be determined that the right follower wheel $W_{FR}$ has been reduced in diameter.

Likewise, if the intercept CKID assumes a negative value, the driven wheel speed difference RID is larger than the follower wheel speed difference FID, and it can be determined that a reduction in diameter has been produced in any of the left and right driven wheels $W_{RL}$ and $W_{RR}$. At this time, if the driven wheel speed difference RID [the steering angle conversion value of VWNL–VWNR] is a positive value, it can be determined that the left driven wheel $W_{RL}$ has been reduced in diameter. If the driven wheel speed difference FID is a negative value, it can be determined that the right driven wheel $W_{RR}$ has been reduced in diameter.

In this manner, the driven wheel slip amount KIDD, at the time when the driven wheel torque is extremely small, is estimated, and the deviation CKID between the follower wheel speed difference FID and the driven wheel speed difference RID (i.e., the intercept CKID) is calculated based on such driven wheel slip amount KIDD. Therefore, a reduction in tire pressure of the follower wheels $W_{FL}$ and $W_{FR}$ and of the driven wheels $W_{RL}$ and $W_{RR}$ can be precisely determined while eliminating an influence of any slippage of the driven wheels $W_{RL}$ and $W_{RR}$.

Although the embodiment of the present invention has been described in detail, it will be understood that the present invention is not limited to the above-described embodiment, and various modifications may be made without departing from the subject matter and scope of the invention defined in claims.

[Effect of the Invention]

As discussed above, according to the invention, the characteristic of variation in driven wheel slip amount relative to the driven wheel torque is estimated, and the deviation between the follower wheel speed difference and the driven wheel speed difference is calculated as the driven slip amount in the state in which the driven wheel torque in this variation characteristic is zero. The reduction in pressure in the follower wheels and in the driven wheels is determined based on this deviation. Therefore, it is possible to perform the correct determination which is not influenced by the slipping state of the driven wheels.

According to an aspect of the invention, it is possible to correctly presume the characteristic of variation in driven wheel slip amount relative to the driven wheel torque by gaining the data in each of the plurality of torque areas. In addition, the data in the torque areas including the state of the driven wheel torque of zero are gained in the amount larger than the amount of data in the other torque areas. Therefore, it is possible to enhance the accuracy in calculating the deviation between the follower wheel speed difference and the driven wheel speed difference as the driven wheel slip amount in the state of the driven wheel torque of zero.

The present invention additionally contemplates the torque area for obtaining the data for estimating the characteristic of variation in driven wheel slip amount relative to the driven wheel torque being limited in accordance with the friction coefficient of the road surface. Therefore, the data can be taken in the torque area in which the linearity is maintained between the driven wheel torque and the driven wheel slip amount, thereby correctly estimating the variation characteristic.

What is claimed is:

1. A wheel pressure-reduction determining system for a vehicle, comprising:

a follower wheel speed difference calculating means (M1) for calculating a follower wheel speed difference (FID) as a difference between left and right follower wheel speeds (VWNL and VWNR);

a driven wheel speed difference calculating means (M2) for calculating a driven wheel speed difference (RID) as a difference between left and right driven wheel speeds (VWDL and VWDR);

a driven wheel slip amount calculating means (M4) for calculating a driven wheel slip amount (KIDD) of said follower and driven wheel speeds as a deviation between both said speed differences (FID and RID);

a driven wheel torque calculating means (M5) for calculating a driven wheel torque (TQDW) based on an engine torque;

a driven wheel slip amount estimating means (M6) for estimating a characteristic of variation in said driven wheel slip amount (KIDD) relative to the driven wheel torque (TQDW), based on said driven wheel slip amount (KIDD) and said driven wheel torque (TQDW);

a deviation calculating means (M7) for calculating a deviation (CKID) between both said speed differences (FID and RID) of said follower and driven wheel speeds as said driven wheel slip amount (KIDD) at the time when the driven wheel torque (TQDW) is zero, from said variation characteristic estimated by said driven wheel slip amount estimating means (M6); and a wheel pressure-reduction determining means (M8) for determining a reduction in pressure of follower wheels ($W_{FL}$ and $W_{FR}$) an driven wheels ($W_{RL}$ and $W_{RR}$) by comparing said deviation (CKID) calculated by said deviation calculating means (M7) with a predetermined reference value.

2. A wheel pressure-reduction determining system for a vehicle according to claim 1, wherein said driven wheel slip amount estimating means (M6) obtains data for estimating said variation characteristic of the driven wheel slip amount (KIDD) relative to the driven wheel torque (TQDW) in each of plurality of torque areas classified depending upon the magnitude of the driven wheel torque (TQDW), and obtains data in the torque areas including a state of driven wheel torque of zero in an amount larger than the amount of data in other torque areas.

3. A wheel pressure-reduction determining system for a vehicle comprising:

a follower wheel speed difference calculating means (M1) for calculating a follower wheel speed difference (FID) as a difference between left and right follower wheel speeds (VWNL and VWNR);

a driven wheel speed difference calculating means (M2) for calculating a driven wheel speed difference (RID)

as a difference between left and right driven wheel speeds (VWDL and VWDR);

a driven wheel slip amount calculating means (M4) for calculating a driven wheel slip amount (KIDD) of said follower and driven wheel speeds as a deviation between both said speed differences (FID and RID);

a driven wheel torque calculating means (M5) for calculating a driven wheel torque (TQDW) based on an engine torque;

a driven wheel slip amount estimating means (M6) for estimating a characteristic of variation in said driven wheel slip amount (KIDD) relative to the driven wheel torque (TQDW), based on said driven wheel slip amount (KIDD) and said driven wheel torque (TQDW);

a deviation calculating means (M7) for calculating a deviation (CKID) between both said speed differences (FID and RID) of said follower and driven wheel speeds as said driven wheel slip amount (KIDD) at the time when the driven wheel torque (TODW) is zero, from said variation characteristic estimated by said driven wheel slip amount estimating means (M6); and a wheel pressure-reduction determining means (M8) for determining a reduction in pressure of follower wheels ($W_{FL}$ and $W_{FR}$) an driven wheels ($W_{RL}$ and $W_{RR}$) by comparing said deviation (CKID) calculated by said deviation calculating means (M7) with a predetermined reference value, wherein said driven wheel slip amount estimating means (M6) includes a driven wheel torque area limiting means (M3) for limiting a torque area for obtaining data for estimating said variation characteristic in accordance with a friction coefficient of road surface.

* * * * *